United States Patent
Mears et al.

(10) Patent No.: US 8,346,063 B2
(45) Date of Patent: Jan. 1, 2013

(54) RECORDING DEVICE AND METHOD OF OPERATION

(75) Inventors: Mark Gilmore Mears, Zionsville, IN (US); Mark Alan Logan, Beech Grove, IN (US)

(73) Assignee: Shenzhen TCL New Technology Ltd, Shenzhen, Guangdong (CN)

( * ) Notice: Subject to any disclaimer, the term of this patent is extended or adjusted under 35 U.S.C. 154(b) by 340 days.

(21) Appl. No.: 12/674,654

(22) PCT Filed: Feb. 27, 2008

(86) PCT No.: PCT/US2008/055159
§ 371 (c)(1),
(2), (4) Date: Feb. 22, 2010

(87) PCT Pub. No.: WO2009/035716
PCT Pub. Date: Mar. 19, 2009

(65) Prior Publication Data
US 2011/0123177 A1    May 26, 2011

(30) Foreign Application Priority Data
Sep. 13, 2007   (CN) .......................... 2007 1 0077091

(51) Int. Cl.
*H04N 5/76* (2006.01)
*H04N 9/80* (2006.01)

(52) U.S. Cl. ........ 386/291; 386/297; 386/298; 386/239; 386/240; 386/248

(58) Field of Classification Search .................. 386/291, 386/297, 298, 239, 240, 248
See application file for complete search history.

(56) References Cited

U.S. PATENT DOCUMENTS

| | | |
|---|---|---|
| 2002/0181935 A1 | 12/2002 | Otana |
| 2003/0106056 A1 | 6/2003 | Naimpally |
| 2006/0015903 A1* | 1/2006 | MacBeth et al. ................ 725/46 |
| 2006/0083483 A1 | 4/2006 | Suzuki |
| 2006/0147180 A1* | 7/2006 | Sakatani .......................... 386/83 |
| 2006/0250713 A1 | 11/2006 | Yoo et al. |

FOREIGN PATENT DOCUMENTS

| | | |
|---|---|---|
| EP | 1001615 A1 | 5/2000 |
| KR | 1020040044234 A | 5/2004 |
| KR | 1020050038329 A | 4/2005 |
| KR | 1020060061755 A | 6/2006 |

OTHER PUBLICATIONS

PCT International Search Report and Written Opinion of the International Searching Authority, PCT/US2008/055159, mailed Aug. 6, 2008, 12 pp.
Extended European Search Report, EP 08730863, mailed Nov. 18, 2010.

* cited by examiner

*Primary Examiner* — Daquan Zhao
(74) *Attorney, Agent, or Firm* — Fletcher Yoder P.C.

(57) ABSTRACT

An exemplary method of operating a recording device comprises acquiring a title of a recorded program when a recording operation begins. The exemplary method further comprises determining, at a first specific time period after a next-occurring hour of the clock or after a next-occurring half hour of the clock during the recording operation, whichever occurs first, whether the recording operation started within a second specific time period, the second specific time period being between the first specific time period and thirty minutes, storing as the title of the recorded program the title acquired when the recording operation began if the recording operation was not started within the second specific time period, and reacquiring the title of the recorded program if the recording operation was started within the second specific time period.

20 Claims, 2 Drawing Sheets

RECORDING DEVICE AND METHOD OF OPERATION

FIELD OF THE INVENTION

The present invention relates generally to features of audio or visual recording devices. In particular, exemplary embodiments of the present invention relate to a system and method that facilitate associating the correct title of a recorded program with the recorded program.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Watching television is a very popular pastime throughout the world. Television viewers often utilize video cassette recorders (and other broadcast recording devices conventionally known) for recording programs to be enjoyed later. It is desirable for recording devices to capture the correct title of programs that are recorded.

In a video or audio recording device which does not have an electronic program guide, the title of the program is typically determined by information provided in a broadcast signal, such as Program System Information Protocol (PSIP) data for digital-TV programs or Extended Data Services (XDS) data for analog-TV programs. If the title of a recorded program is captured from this information, the title may be displayed to the user as part of a list of recorded programs, even though the user's system does not support or include an electronic program guide. Unfortunately, network programs sometimes start slightly before the hour or half hour in which they are scheduled to start. As a result, current devices, if set to begin recording specifically on the hour or half hour, often miss a few minutes of the program. To help assure that the entire program is captured, a user may program the recording device timer to start recording slightly earlier than the desired program is scheduled to begin so that the entire program is recorded. This may, however, cause the title displayed in the user's list of recorded programs to incorrectly list the title of the preceding program rather than the title of the program the user intended to record. The user may subsequently be confused about whether the desired program was in fact recorded. As a result, many consumer electronic devices simply record and display the time, channel number, and duration for the recording in order to avoid the problem with capturing the title all together.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Exemplary embodiments of the present invention provide an approach to solving the problem of capturing the correct title of a program from a broadcast signal when the recording is started slightly before the scheduled start time of the program (i.e., a time buffer has been added). Additionally, exemplary embodiments of the invention do not require or need user intervention, (e.g., forcing the user to choose between two titles by either being presented a pop-up dialog box, or by having to remember to go to a menu to choose between two title choices) nor does it require the addition of a menu item into the software because the correct title is captured automatically. The title of the program is determined by information provided by in a received broadcast itself, using, for example, PSIP data or XDS data.

Figure 1:
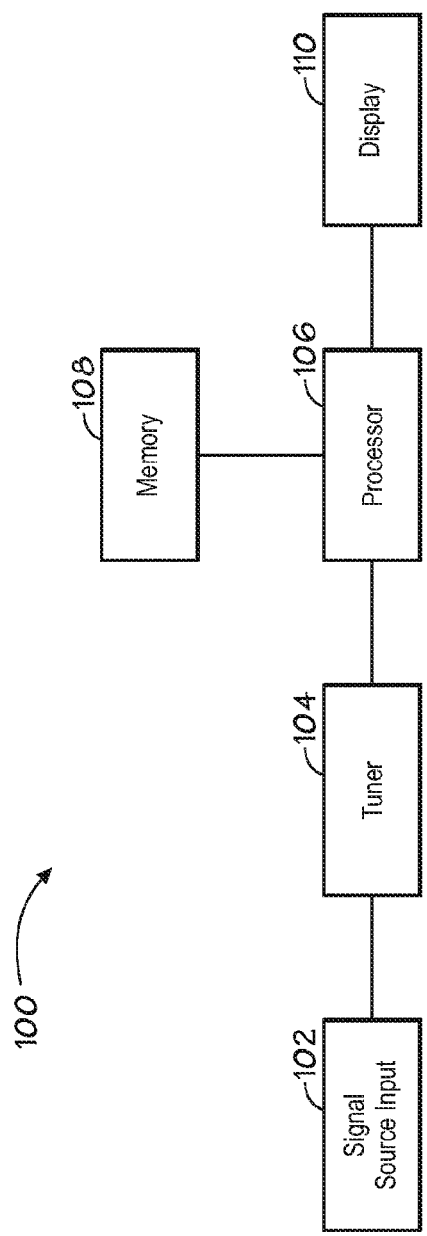
FIG. 1 is a block diagram of an electronic device in accordance with an exemplary embodiment of the present invention.

FIG. 1 is a block diagram of an electronic device in accordance with an exemplary embodiment of the present invention. The electronic device (e.g., a television, DVR, radio, set top box, or the like) is generally referred to by the reference number 100. The electronic device 100 comprises a signal source input (e.g., a cable inlet or an antenna) 102, a tuner 104, a processor 106, a memory 108, and a display 110. The memory 108 may be adapted to hold machine-readable computer code that causes the processor 106 to perform an exemplary method in accordance with the present invention. Those of ordinary skill in the art will appreciate that the various functional blocks shown in FIG. 1 may comprise hardware elements (including circuitry), software elements (including computer code stored on a machine-readable medium) or a combination of both hardware and software elements.

The signal source input 102 may comprise an antenna input, an RCA input, an s-video input, a composite video input or the like. The signal source input 102 is adapted to receive a signal that comprises video or audio data that includes the program title information. The title information is provided as part of a typical broadcast signal using, for example, PSIP data or XDS data. A tuner subsystem 104 is adapted to tune a particular audio or video program title from a broadcast signal received from the signal input source 102.

The processor 106 is adapted to control the overall operation of the electronic device 100. A memory 108 may be associated with the processor 106 to hold machine-readable computer code that causes the processor 106 to control the operation of the electronic device 100. A display system 110 may comprise a television, a monitor, or any other suitable display type.

An exemplary embodiment of the present invention is adapted to help ensure that the correct program title is associated with a recorded program, even if the user starts a recording at a time when program data in a broadcast signal relates to the program that precedes the program that the user desires to record. To accomplish this result, the processor 106 is programmed to extract the program name from the broadcast signal when a recording is started. At a specific time after the next-occurring hour or half hour of the clock (for example, at six minutes after the next occurring hour or half hour of the clock), a determination is made about how long the recording has been in progress. If the recording has been in progress for less than a specific time period (for example, 10-15 minutes), it is assumed that the user might have implemented a time buffer to capture the entirety of the desired program, so the processor 106 is programmed to extract the program name from the broadcast signal data and store this second-extracted name as the title of the recorded program instead of the name extracted when the recording started. Additional details regarding the operation of an exemplary embodiment of the present invention are set forth below with respect to FIG. 2.

Figure 2:
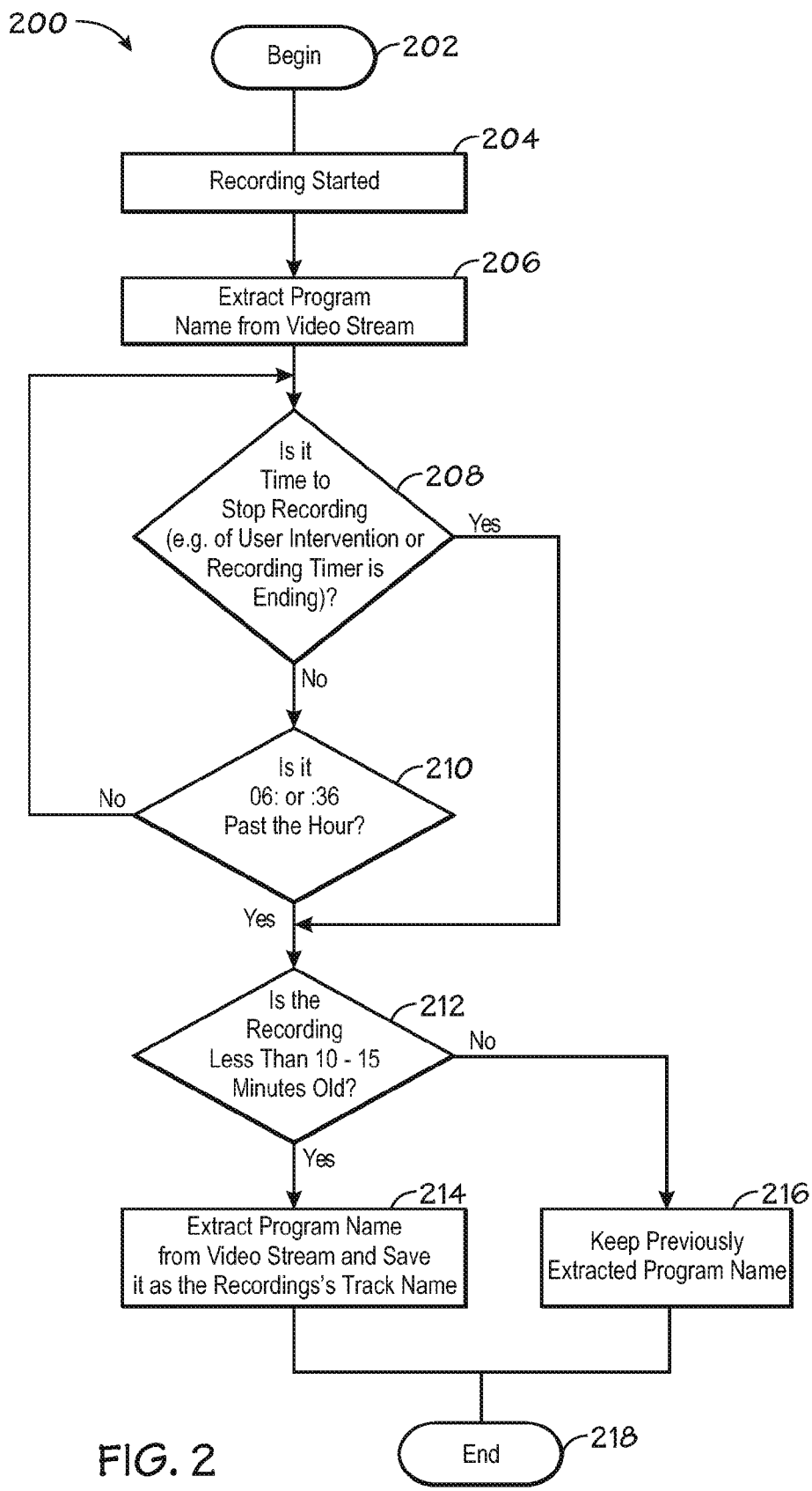
FIG. 2 is a process flow diagram representing a method in accordance with an exemplary embodiment of the present invention.

FIG. 2 is a process flow diagram showing a process in accordance with an exemplary embodiment of the present invention. The process is generally referred to by reference numeral 200.

At block 202, the process begins. At block 204 a recording device starts a recording of the broadcast signal selected by a user. When the recording is started, a title of the recorded program is acquired from the broadcast signal, as represented by block 206. At block 208, a determination is made about whether it is time to stop the recording process. For example, the program being recorded may have ended or the user may have manually intervened to stop a recording. If it is not time to stop recording, then a determination is made at block 210 about whether it is currently a first specific time period after the next-occurring hour or half hour of the clock from the start of the recording, whichever occurs first. In an exemplary embodiment of the present invention, the first specific time period is about six (6) minutes. As used herein, the expression "about six (6) minutes" means a time period between 5.5 minutes and 6.5 minutes. If, at block 210, it is not currently the first specific time period after the next-occurring hour or half hour from the start of the recording, process flow returns to block 208, where a determination is again made about whether it is currently time to stop the recording.

If at any determination that it is currently time to stop a recording (block 208) or at any determination that it is currently the first specific time period after the hour or half hour of the clock from the start of the recording (block 210), whichever comes first, a determination is made at block 212 about whether the recording has been in progress for less than a second specific time period. The second specific time period is desirably between the first specific time period and thirty minutes. In an exemplary embodiment of the invention, the second specific time is about 10 to 15 minutes. As used herein, the expression "about ten to fifteen minutes" means a time period between 9.5 minutes and 15.5 minutes. If the recording is not older than the second specific time period (i.e., the recording has been in progress for less than the second specific time period), then the program name is extracted from the broadcast signal a second time, and this second-extracted program name is stored as the title of the recorded program, as shown at block 214. If, on the other hand, the recording was started longer ago than the length of the second specific time period, then the program name extracted when the program started is kept as the title of the recorded program, as shown at block 216. The process then ends at block 218.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of operating a recording device, comprising:
    beginning a recording operation to record a program from a signal source;
    acquiring from the signal source a title of the recorded program when the recording operation begins;
    determining, at a first specific time period after a next-occurring hour or half hour of a clock during the recording operation, whether the recording operation has been in progress for less than a second specific time period;
    storing as the title of the recorded program the previously acquired title if the recording operation has been in progress for more than the second specific time period; and
    reacquiring from the signal source the title of the recorded program and storing the reacquired title as the title of the recorded program if the recording operation has been in progress for less than the second specific time period.

2. The method recited in claim 1, wherein the first specific time period is about six minutes.

3. The method recited in claim 2, wherein the second specific time period is about 10-15 minutes.

4. The method recited in claim 1, wherein the second specific time period is about 10-15 minutes.

5. The method recited in claim 1, wherein the recording device comprises a television.

6. The method recited in claim 1, wherein the recording device comprises a digital video recorder.

7. The method recited in claim 1, wherein the title of the recorded program is acquired from Program System Information Protocol (PSIP) data.

8. The method recited in claim 1, wherein the title of the recorded program is acquired from Extended Data Services (XDS) data.

9. The method recited in claim 1, wherein the recited acts are performed in the order in which they are recited.

10. An electronic device, comprising:
    a tuner that is configured to receive a signal corresponding to a program to be recorded as a recorded program during a recording operation; and
    a processor that is adapted to:
        acquire a title of the recorded program from the signal when the recording operation begins;
        determine, at a first specific time period after a next-occurring hour or half hour of a clock during the recording operation, whether the recording operation has been in progress for less than a second specific time period;
        store as the title of the recorded program the previously acquired title if the recording operation has been in progress for more than the second specific time period; and
        reacquire the title of the recorded program from the signal and store the reacquired title as the title of the recorded program if the recording operation has been in progress for less than the second specific time period.

11. The electronic device recited in claim 10, wherein the first specific time period comprises is about six minutes.

12. The electronic device recited in claim 11, wherein the second specific time period is about 10-15 minutes.

13. The electronic device recited in claim 10, wherein the second specific time period is about 10-15 minutes.

14. The electronic device recited in claim 10, wherein the electronic device comprises a television.

15. The electronic device recited in claim 10, wherein the electronic device comprises a digital video recorder.

16. The electronic device recited in claim 10, wherein the title of the recorded program is acquired from Program System Information Protocol (PSIP) data.

17. The electronic device recited in claim 10, wherein the title of the recorded program is acquired from Extended Data Services (XDS) data.

18. A non-transitory machine readable medium storing instructions executed by a processor of an electronic device, the instructions comprising:

instructions to begin recording of a program from a signal source at a beginning of the recording operation;

instructions to acquire a title of the recorded program from the signal source when the recording operation begins;

instructions to determine, at a first specific time period after a next-occurring hour or half hour of a clock during the recording operation, whether the recording operation has been in progress for less than a second specific time period, instructions to store as the title of the recorded program the previously acquired title if the recording operation has been in progress for more than the second specific time period; and instructions to reacquire the title of the recorded program from the signal source and store the reacquired title as the title of the recorded program if the recording operation has been in progress for less than the second specific time period.

19. The non-transitory machine readable medium in claim 18, wherein the first specific time period is about six minutes.

20. The non-transitory machine readable medium in claim 18, wherein the second specific time period is about 10-15 minutes.

* * * * *